Feb. 19, 1924.

E. A. SPERRY 1,483,992

MEANS FOR SPINNING UP GYROSCOPES ON AIRCRAFT

Filed Feb. 21, 1920  3 Sheets-Sheet 1

INVENTOR
Elmer A. Sperry.
BY
Herbert H. Thompson
his ATTORNEY

Feb. 19, 1924.
E. A. SPERRY
1,483,992
MEANS FOR SPINNING UP GYROSCOPES ON AIRCRAFT
Filed Feb. 21, 1920     3 Sheets-Sheet 2
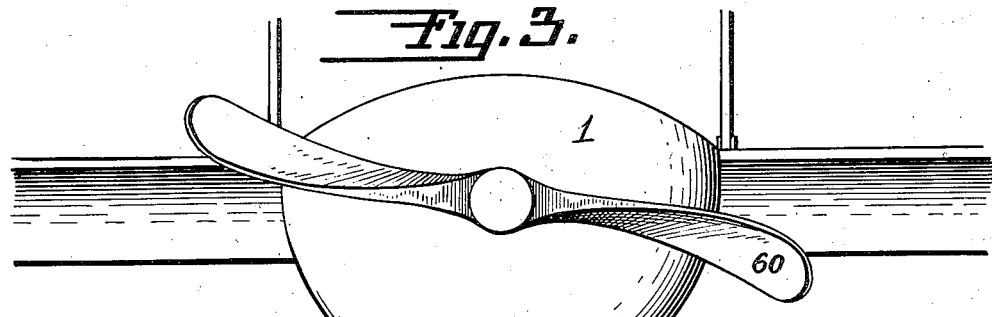
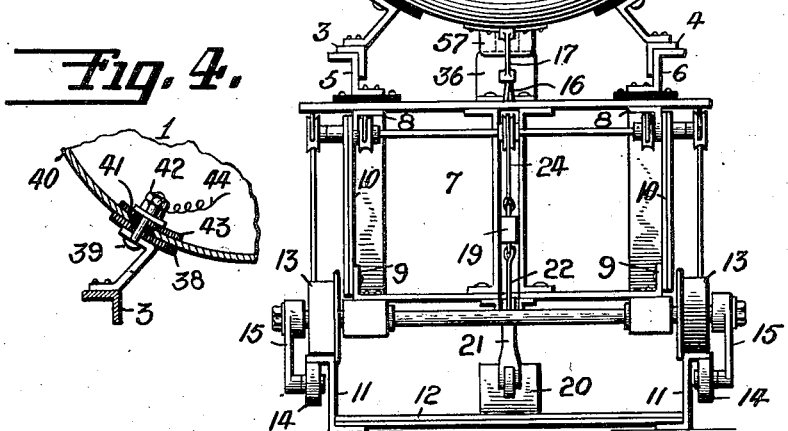
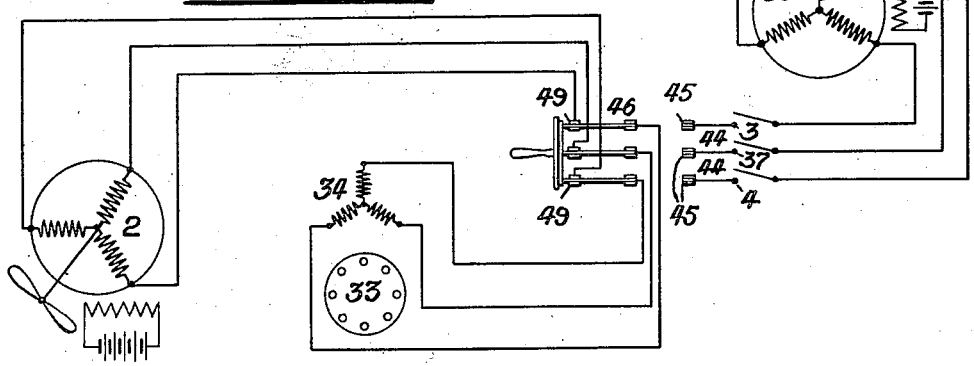
INVENTOR
ELMER A. SPERRY.
BY
Herbert H. Thompson
his ATTORNEY

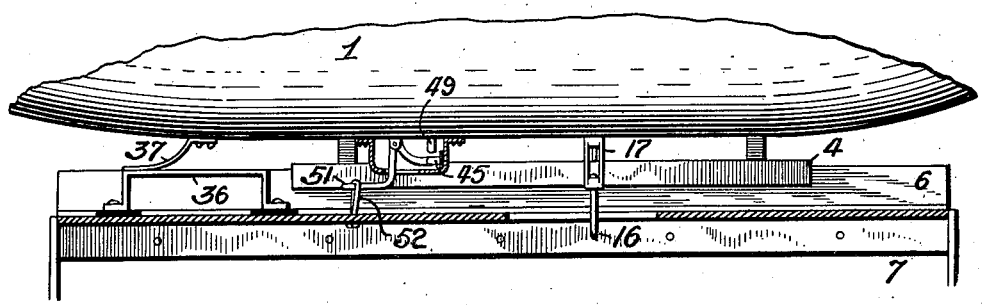
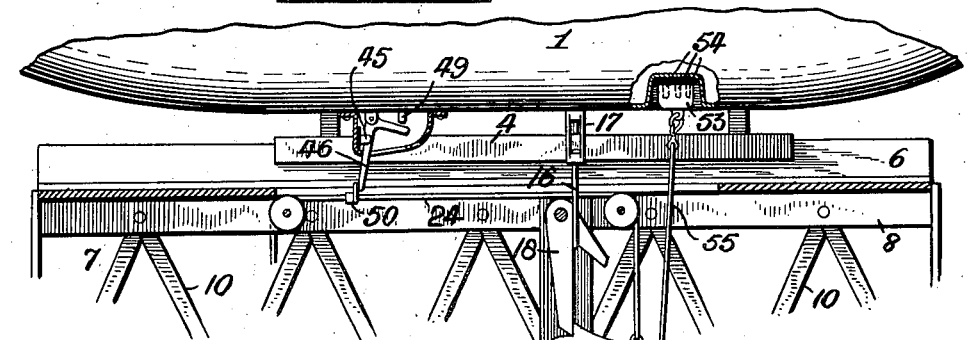
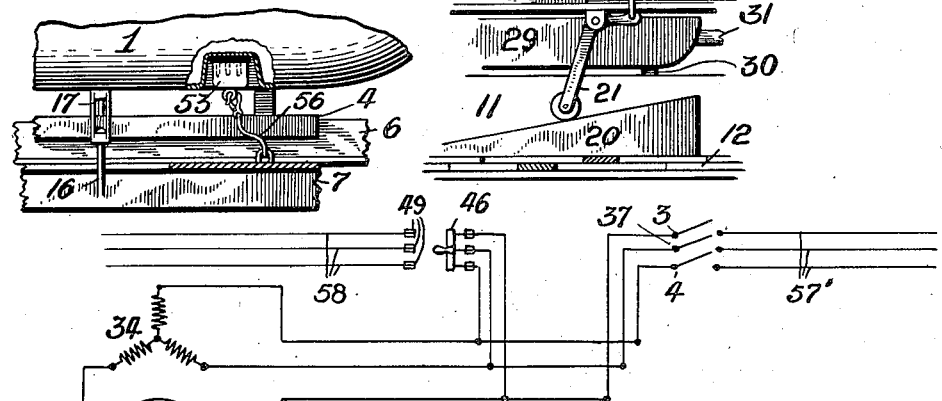
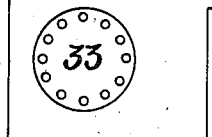

Patented Feb. 19, 1924.

1,483,992

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

MEANS FOR SPINNING UP GYROSCOPES ON AIRCRAFT.

Application filed February 21, 1920. Serial No. 360,319.

*To all whom it may concern:*

Be it known that I, ELMER A. SPERRY, a citizen of the United States of America, residing at 1505 Albemarle Road, Brooklyn, New York, in the county of Kings and State of New York, have invented certain new and useful Improvements in Means for Spinning Up Gyroscopes on Aircraft, of which the following is a specification.

This invention relates to the spinning up and driving of gyroscopes on aeroplanes or, more particularly, aerial torpedoes. This application contains subject-matter common to my prior application Serial No. 47,550, filed August 26, 1915. As is well known in the art, aeroplanes and aerial torpedoes are commonly provided with steering apparatus controlled by one or more gyroscopes. To secure the most accurate steering the gyroscope should be spun to a high speed before the flight of the aircraft commences, and during the flight such speed should be sustained. The speed of the gyroscope is usually sustained by a small generator located on the aeroplane or torpedo and driven by the wind or in any other suitable manner. By the means which I have provided the gyroscope may be spun up prior to and during the launching operation by an outside generator so that it may be brought to high speed in a minimum time, and, at or about the time when the aircraft commences to rise on its flight, the gyroscope may be automatically disconnected from the outside generator and connected with the generator on the aircraft. In this manner the launching of the aircraft and spinning up of the gyroscope may be accomplished more speedily than has heretofore been the case, and, furthermore, the gyroscope may be instantly connected with the speed sustaining generator on the aircraft substantially at the time that the craft commences to rise in the air.

Referring to the drawings wherein I have shown what I now consider to be the preferred forms of my invention:

Fig. 3 is a front elevation of the torpedo and car.

Fig. 4 is a sectional view of a detail.

Fig. 5 is a wiring diagram.

Fig. 6 is a view of a modified form of my invention.

Fig. 7 is a view of another modification.

Fig. 8 is a view of still another modification.

Fig. 9 is a modified wiring diagram.

Figure 1:
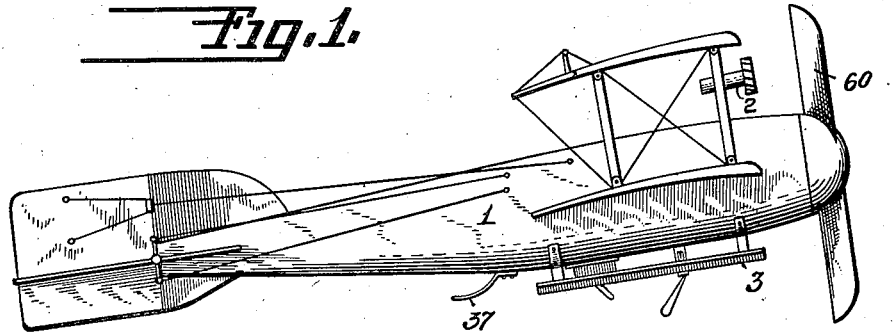
Fig. 1 is a side elevation of an aerial torpedo and a launching car therefor.

In Fig. 1 I have shown an aircraft 1, which may be either an aeroplane or an aerial torpedo, provided with a generator 2 for supplying current to one or more steering gyroscopes in the manner well known in the art. While said generator may be driven by the propeller shaft, I have shown it as wind driven. The aircraft may be provided with skids 3 and 4 adapted to rest upon angle bars 5 and 6, respectively, of a launching car 7.

The car 7 may be of any suitable light construction and is shown as made up of angle bars 8 and 9 connected by lattice work 10. A suitable track formed of Z bars 11 secured to cross-ties 12 may be provided for the car, the wheels 13 of the latter being flanged in the usual manner. Auxiliary rollers 14 journaled on arms 15 suitably secured to the car may be provided to prevent the car from being lifted from the track by the aircraft. The latter may be firmly clamped upon the car by means of a stout hook or loop 16, preferably provided with a turn buckle 17, and adapted to be hooked over pivoted latch 18 which is normally prevented from turning upwardly by catch 19.

The car 7 thus far described is shown and described in detail in my copending application for launching mechanism for aeroplanes, Serial No. 248,834, filed August 8, 1918. The car is preferably accelerated by any suitable driving means up to a predetermined point on the track, approximately three-fifths to two-thirds of the length thereof, at which point the driving means is disconnected from the car. The aircraft is then released and a brake applied to the car. One form of means for applying said brake, as described in detail in my application aforesaid, may be constructed substantially as follows:

A suitable trip 20 may be placed on the track at a predetermined position to engage a projection on the car such as bell crank lever 21 and rotate the same in a clockwise direction. Said lever may be connected by a link 22 with catch 19 whereby upon rotation of said lever said catch may be depressed against the action of spring 23. Also connected to said catch or to the bell crank lever by means of a flexible connection 24 is a pin 25 which engages a weighted lever 26. The latter lever is resiliently pressed to the left by a spring 27 so that, when pin 25 is withdrawn, said lever will be rotated counter-clockwise. Connected to lever 26 by a link 27′ is a lower brake shoe 28 pivotally suspended from an upper brake shoe 29 by links 30. The upper brake shoe is, in turn, pivotally suspended by link 31 from the car 7. As shown, brake shoes 28 and 29 are disposed to grip one of rails 11 between them when spring 27 pulls weighted lever 26 to the left as shown in Fig. 1. It will thus readily be seen that by this or other equivalent arrangement a snubbing post action is secured, since, with the car moving toward the right (Figs. 1 and 2), as soon as pin 25 is withdrawn lever 26 will be drawn to the left by spring 27 to cause brake shoe 28 to engage the rail. The friction of shoe 28 with the rail will then draw said shoe rearwardly and thereby draw the upper brake shoe 29 into engagement with the top of the rail. In order to prevent too severe braking of the car, lever 26 is shown as weighted at its upper end 32, so that, when the deceleration of the car exceeds a predetermined amount the weighted end will tend to move forward against the action of spring 27 to lessen the braking effect.

I have indicated diagrammatically at 33 in Fig. 5 a gyroscope which may be mounted on the aircraft for any suitable purpose such as controlling the steering thereof, as is well known in the art. While this gyroscope may be driven in any suitable manner I have shown it driven as the rotor of a three phase induction motor, the field of which is shown at 34. For bringing the gyroscope up to speed I have provided means whereby it may be connected, while the aircraft is on the car 7, to an exterior generator 35. While current may be conducted in various ways from the generator to the gyroscope, I prefer to connect the three phase mains from the generator to angle bars 5 and 6, and to a third contact 36 on the launching car, from whence current can be conducted to the gyroscope by skids 3 and 4 and brush 37. As shown, bars 5 and 6 and contact 36 are insulated from the car, though, if desired, one of these contacts might obviously be grounded to the car.

In Fig. 4 is shown one form of connection which may be used in conducting the current through the shell of the aircraft. While this showing is in connection with skid 3 it is evident that similar connecting means may be used in connection with skid 4 and brush 37. Skid 3 is shown insulated from shell 40 of aircraft 1 by a suitable insulating member 38 and may be clamped thereto by a bolt 39 passing through said shell and suitably insulated therefrom at 41. The inner end of said bolt may be provided with nuts 42 to form a suitable binding post insulated by washer 43 from the inside surface of shell 40.

Figure 2:
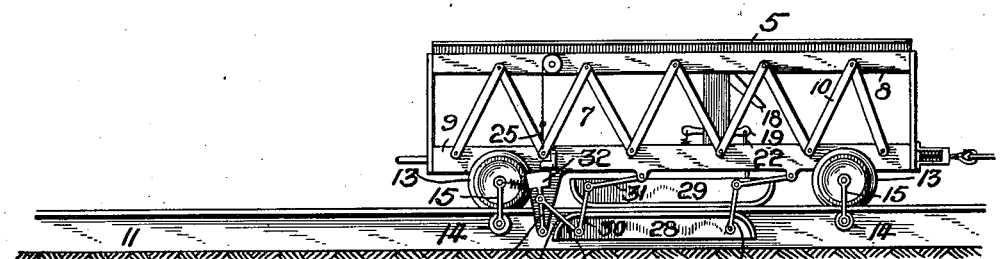
Fig. 2 is a longitudinal sectional view of the launching car showing part of the torpedo mounted thereon.
Figure 2:
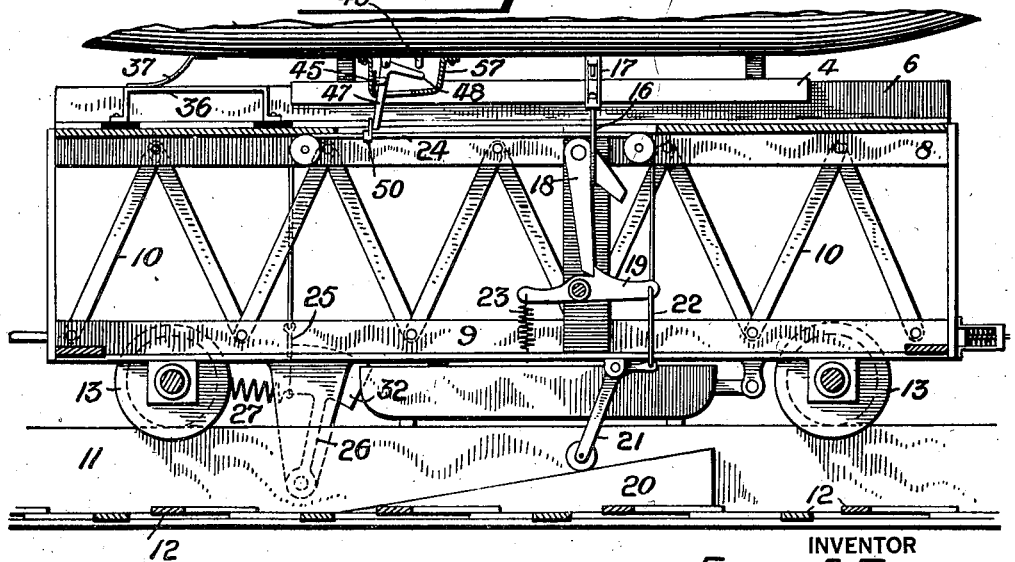

As shown diagrammatically in Fig. 5, wires 44 may connect skids 3 and 4 and brush 37 with contacts 45 adapted to be engaged by blades of a suitable three pole double throw switch 46 connected to field 34. When said switch is engaged with contacts 45, it will be seen from Fig. 5 that current may flow from contacts 45 through field 34 of the gyroscope. The double throw switch 46 is, as shown in Fig. 2, provided with sets of blades 47 and 48, the former for engaging contacts 45 and the latter for contacts 49. As will be readily understood from Figs. 2 and 5, when the switch 46 is connected to contacts 49 current will be supplied to field 34 by means of generator 2. For protecting switch 46 and contacts 45 and 49 I have shown a housing 57 attached to the bottom of the aircraft.

From the construction above described it will now readily be seen that, if switch 46 be connected to contacts 45, current may be supplied to the gyroscope the instant that skids 3 and 4 and brush 37 on the aircraft contact with angle bars 5 and 6 and contact 36 on the car 7. The gyroscope may thus be spun up while on the car. Meanwhile the engine (not shown) of the aircraft may be started to drive the propeller 60, the air currents generated by which may drive generator 2. Generator 35 may be supported in any suitable manner exterior to and independently of the aircraft. For launching the aircraft, car 7 may be drawn rapidly along the track by any suitable means, such for example as that disclosed in my copending application above referred to. During the movement of the car along the track the spinning up of the gyroscope will be continued until the gyroscope is disconnected from generator 35. If generator 35 is supported independently of car 7, the leads from said generator should, of course, be sufficiently long to permit such movement of the car. In order that the disconnection of the gyroscope from generator 35, the connection of the gyroscope to generator 2 and the release of the aircraft may be accomplished in a minimum of time, I have provided means for automatically throwing switch 46 out of engagement with contacts 45 and into engagement with contacts 49 simultaneously with the release of the aircraft from the launching car. One form of such means may be constructed substantially as follows:

Attached to flexible member 24 is a projection 50, which is adapted to engage with a part of switch 46, such as one of switch blades 47 when the aircraft is positioned on the car as shown in Fig. 2. When the car reaches a position on the track such that lever 21 engages trip 20, it will be seen that the flexible element 24 and projection 50 will be moved toward the right and that switch 46 will be thrown by projection 50 into engagement with contacts 49 and out of engagement with contacts 45. At the same time catch 19 is actuated and loop 16 released from latch 18 so that the aircraft can rise from the car. Thus, at the time the aircraft is released, the gyroscope may be automatically thrown into connection with generator 2 which is being driven by propeller 60.

My invention may be modified in various ways. For instance, an alternative method of throwing double throw switch 46 is shown in Fig. 6. In this figure the switch is provided with but one set of blades adapted to be thrown from one set of contacts 45 to the other 49 or vice versa. An arm 51 of the switch is adapted to be engaged, as shown, with a loop 52 on the car. From this construction it will now be seen that, when the aircraft commences to rise from the car, loop 52 will act to throw the switch out of engagement with contacts 45 and into engagement with contacts 49.

Instead of leading in current to contacts 45 by means above described I may utilize a three contact plug 53 as shown in Fig. 7 connected with generator 35 and adapted to engage contacts 54 on the aircraft, in turn connected to contacts 45. Plug 53 may be connected by a cord 55 with catch 19 so that, when said catch is tripped to release the aircraft, plug 53 will be withdrawn from engagement with contacts 54. At the same time, switch 46 will be thrown by projection 50 out of engagement with contacts 45 and into engagement with contacts 49.

A further modification of the form of invention of Fig. 7 is shown in Fig. 8 wherein plug 53 is shown connected by a flexible element 56 directly with the body of car 7. Obviously, when the aircraft rises, plug 53 will be withdrawn.

In Fig. 9 I have shown a modified wiring diagram, from which it will be seen that the contacts 45 may be omitted and the field 34 of the generator connected directly to skids 3 and 4 and contact 36 or to contacts 54, depending on the form of invention used. In this diagram, wires 57' lead to the exterior generator and wires 58 to the generator on the aircraft. With this system of connections switch 46 may be a single throw switch and it is merely necessary that said switch be moved, as by any of the means above described, into engagement with contacts 49 when the aircraft commences to rise.

From the foregoing description it will be clear that the gyroscope may quickly be spun up by generator 35 prior to and during launching and that the disconnection of the gyroscope from said generator and its connection with generator 2 are accomplished automatically upon the release of the aircraft from the launching device.

I prefer that the aircraft be released from the car at a time when the acceleration of the car has been decreased to such an extent that no force is exerted between the aircraft and car. This may be accomplished by disconnecting the driving means from the launching car at a suitable time before lever 21 engages trip 20. When the driving means is disconnected from the car, the velocity of the latter, of course, tends to decrease while the craft aided by its propelling means continues to accelerate so that while the car originally exerted a pull on the aircraft, the latter would soon exert a pull on the car if their connections were maintained. From this it follows that at some point neither is exerting a pull on the other. Preferably at this point the release of the aircraft should occur, since no force is then exerted between the air craft and car, and the release can be caused with the minimum of effort.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim as new and desire to secure by Letters Patent is:

1. In combination, an aircraft provided with a gyroscope, a launching track for said aircraft, means exterior to said aircraft for spinning up said gyroscope, means on said aircraft for sustaining the spin of said gyroscope, and means for automatically disconnecting said gyroscope from the first named means and connecting the gyroscope to the second named means during the launching of the aircraft from said track.

2. In combination, an aircraft provided with a gyroscope, a launching track for said aircraft, a source of energy exterior to the aircraft for imparting a spin to said gyroscope, a source of energy on said aircraft for sustaining the spin of said gyroscope, launching means for said aircraft, and means interposed between said aircraft and said launching means for disconnecting said gyroscope from the first mentioned source and connecting the gyroscope to the second named source upon release of said aircraft from said track.

3. In combination with an aircraft provided with a gyroscope, means for spinning up said gyroscope, means for sustaining the spin of said gyroscope during the flight of the aircraft, a launching track for said aircraft, and means on said track cooperating with said aircraft during the launching thereof for disconnecting the gyroscope from the first named means and connecting said gyroscope with the second named means.

4. In combination with an aircraft provided with a gyroscope, a car, means for securing said aircraft to said car, means for releasing said aircraft from the car, means for spinning up said gyroscope, and means operable upon release of said aircraft from the car for disconnecting the gyroscope from said spinning up means.

5. In combination with an aircraft provided with a gyroscope, movable means for launching said aircraft, and means supported independently of said aircraft for spinning up the gyroscope while the first named means is in motion.

6. In combination with an aircraft provided with a gyroscope, a launching car to which said aircraft is adapted to be secured, and means independent of said aircraft for spinning up said gyroscope during the travel of said car.

7. In combination with an aircraft provided with a gyroscope, a launching track for said aircraft, means for spinning up said gyroscope, means for sustaining the spin of the gyroscope during the flight of the aircraft, and means for simultaneously releasing said aircraft from said track and disconnecting the gyroscope from the first-named means and connecting said gyroscope with the second-named means.

8. In combination with an aircraft provided with a gyroscope, means on said aircraft for driving said gyroscope, means on said aircraft adapted to be connected with driving means exterior to the aircraft, launching means for said aircraft, means connecting said aircraft to said launching means, and means operated by the release of the aircraft from said launching means for shifting the connections of the gyroscope from one to the other of said driving means.

9. In combination with an aircraft provided with a gyroscope, means on said aircraft for driving said gyroscope, means for connecting said gyroscope with a driving means exterior to the aircraft, launching means for said aircraft, means connecting said aircraft to said launching means, and automatic means by the release of the aircraft from said launching means for breaking the connection between the gyroscope and exterior driving means and connecting the gyroscope with the driving means on the aircraft.

10. In combination with an aircraft provided with a gyroscope, contacts carried by said aircraft, movable means for launching said aircraft, and contacts on said launching means adapted to be engaged by the contacts on said aircraft for conducting current for driving said gyroscope before said aircraft is launched and during the movement of said launching means.

11. In combination with an aircraft provided with a gyroscope, means for launching said aircraft, an exterior driving means adapted to be connected with the gyroscope, and means operable automatically upon rising of the aircraft from said launching means for disconnecting said gyroscope and said driving means.

12. In combination with an aircraft provided with a gyroscope, means exterior to said aircraft for driving said gyroscope, movable launching means for said aircraft, and means interposed between said aircraft and said launching means for establishing a connection between said driving means and said gyroscope before said aircraft is launched and during the movement of said launching means.

13. In combination with an aircraft provided with a gyroscope, a track, launching means for said aircraft movable on said track, means exterior to said aircraft for driving said gyroscope, and means comprising cooperating elements attached to said aircraft and said launching means, respectively, for establishing a connection between said driving means and said gyroscope.

14. In combination with an air craft provided with a gyroscope, means for launching said aircraft, means for spinning up said gyroscope, means on said aircraft adapted to be connected with said gyroscope for driving the same, means for securing said aircraft to said launching means, and means for simultaneously releasing said aircraft from said launching means, disconnecting the gyroscope from said spinning up means, and connecting the gyroscope with the driving means on the aircraft.

15. In combination with an aircraft provided with a gyroscope, means for launching said aircraft, means for spinning up said gyroscope, means for securing said aircraft to said launching means, and means for simultaneously releasing said aircraft from said launching means and disconnecting the gyroscope from said spinning up means.

16. In combination with an aircraft provided with a gyroscope, launching means to which said aircraft is adapted to be secured, means exterior to said aircraft for spinning up the gyroscope, means on the aircraft for driving said gyroscope, means for automatically releasing the aircraft from said launching means, and means actuated by said releasing means for disconnecting the gyroscope from said spinning up means and connecting said gyroscope to said driving means.

17. In combination with an aircraft provided with a gyroscope, launching means to which said aircraft is adapted to be secured, means exterior to said aircraft for spinning up said gyroscope, means for automatically releasing the aircraft from said launching means, and means actuated by said releasing means for disconnecting the gyroscope from said spinning up means.

18. In combination with an aircraft provided with a gyroscope, movable means for launching said aircraft, and means for spinning up said gyroscope before said aircraft is launched, and during the movement of said launching means.

19. In combination with an aircraft provided with a gyroscope, a track, means on said track for launching said aircraft, means on said aircraft for driving said gyroscope, and means interposed between said launching means and said aircraft and operable automatically during launching of the aircraft for connecting said gyroscope with said driving means.

20. In combination with an aircraft provided with a gyroscope, means for launching said aircraft, means on said aircraft for driving said gyroscope, means for securing said aircraft to said launching means, and means for simultaneously releasing said aircraft from said launching means and connecting said gyroscope with said driving means.

21. In an aerial torpedo, the combination with an electrically spun gyroscope, of an exterior electrical connection whereby said gyroscope may be spun prior to launching and a generator on the torpedo rendered operative by launching of the same for maintaining said spin.

22. In combination, an aircraft, launching means therefor, said aircraft having a propeller adapted to operate during launching, and means settable in predetermined position for automatically releasing said aircraft from said launching means when said aircraft has attained a velocity due to the propeller equal to and independent of the velocity of said launching means.

23. In combination, an aircraft, launching means therefor, means for securing said aircraft to said launching means, and means settable in predetermined position for automatically releasing said aircraft from said launching means when the latter is in motion and at an instant when the launching means exerts no force upon the aircraft in the direction of travel.

24. The method of launching an aircraft which consists of securing said aircraft to a launching device, decreasing the acceleration of said device, and automatically releasing said aircraft from said device when the latter is in motion and at a time when said device exerts no force upon the aircraft in the direction of travel.

25. The method of launching an aircraft which consists of securing said aircraft to a launching device, imparting to said aircraft a velocity independent of said launching device, and automatically releasing said craft from said device when the independent velocity of the craft equals the velocity of said device.

26. In combination with an aircraft provided with a gyroscope, a wind driven generator carried by said aircraft, means for connecting said gyroscope to an external source of power for spinning up said gyroscope, and means for disconnecting the gyroscope from said external source and connecting the gyroscope to said generator.

27. In combination with an aircraft provided with a gyroscope, a wind driven generator carried by said aircraft, means for launching said aircraft, means for connecting said gyroscope to an external source of power for spinning up said gyroscope during launching of the craft, means for releasing said aircraft from said launching means and means for simultaneously disconnecting the gyroscope from said external source and connecting the gyroscope to said generator when the aircraft rises from said launching means.

28. In combination with an aircraft provided with a gyroscope, a launching track for said aircraft, an exterior generator for spinning up said gyroscope, a generator on said aircraft for sustaining the spin of said gyroscope during the flight of the aircraft, means for simultaneously releasing said aircraft from said track, and disconnecting the gyroscope from the first-named generator and connecting said gyroscope with said second named generator.

29. In combination with an aircraft provided with a gyroscope, a track, a launching car for said aircraft mounted on said track, means for spinning up said gyroscope, means for sustaining the spin of said gyroscope during the flight of the aircraft, a brake for said car, and means for simultaneously applying said brake to said car, releasing said aircraft from said car and disconnecting the gyroscope from said first-named means and connecting it with said second named means.

30. In combination with an aircraft provided with a gyroscope, a launching track for said aircraft, means for spinning up said gyroscope, means for sustaining the spin of the gyroscope during the flight of the aircraft, a switch for disconnecting said gyroscope from the first means and connecting it with the second means, means connecting said aircraft to said track and an actuating member for simultaneously releasing the aircraft from said track and operating said switch.

31. In combination with an aircraft provided with a gyroscope, a track, a launching car for said aircraft mounted on said track, means for spinning up said gyroscope, means for sustaining the spin of said gyroscope during the flight of the aircraft, a switch for disconnecting said gyroscope from the first means and connecting it with the second means, means connecting said aircraft to said track, a brake for said car, and an actuating member for simultaneously releasing the aircraft, operating said switch, and applying said brake to the car.

32. In combination with an aircraft provided with a gyroscope, a launching track for said aircraft, means for spinning up said gyroscope, means for sustaining the spin of the gyroscope during the flight of the aircraft, a switch for disconnecting said gyroscope from the first means and connecting it with the second means, means connecting said aircraft to said track, means for breaking the connection between said aircraft and said track and means connected to said last-named means for operating said switch when said connection is broken.

In testimony whereof I have affixed my signature.

ELMER A. SPERRY.